United States Patent

Potash

[15] 3,668,532
[45] June 6, 1972

[54] PEAK DETECTION SYSTEM
[72] Inventor: Hanan Potash, Canoga Park, Calif.
[73] Assignee: Sperry Rand Corporaton, New York, N.Y.
[22] Filed: Jan. 25, 1971
[21] Appl. No.: 109,207

[52] U.S. Cl............................328/151, 307/235, 307/293, 328/116, 328/147
[51] Int. Cl. .........................................................H03k 5/20
[58] Field of Search .................307/235, 293; 328/150, 151, 328/146, 147, 115, 116, 117; 324/77 A

[56] References Cited

UNITED STATES PATENTS 3,334,298  8/1967  Monrad-Krohn .....................324/77 A
3,480,948  11/1969  Lord......................................328/151
3,390,377  6/1968  Elliott....................................328/151

*Primary Examiner*—Donald D. Forrer
*Assistant Examiner*—David M. Carter
*Attorney*—Charles C. English, Sheldon Kapustin and William E. Cleaver

[57] ABSTRACT

A system for detecting the peaks in an analog signal whose amplitude varies with respect to time. The system employs a delta differentiation technique to develop two separate binary differential signals; i.e., a first highly accurate short time constant differential signal and a second relatively noise immune long time constant differential signal. The two differential signals are then logically combined to yield a relatively noise immune output signal which accurately indicates the peaks in the analog signal.

7 Claims, 5 Drawing Figures

INVENTOR.
HANAN POTASH

INVENTOR.
HANAN POTASH

BY

ATTORNEYS

PEAK DETECTION SYSTEM

BACKGROUND OF THE INVENTION

1. Field of the Invention

This invention relates generally to a system for detecting peaks in an analog signal whose amplitude varies with respect to time.

2. Description of the Prior Art

Many applications require the detection of peaks in an analog signal. For example only, in digital storage systems using a moving magnetic recording medium, it is normally necessary to accurately locate the peaks in a magnetic head output signal in order to properly identify the stored data. Typically, the head output signal is applied to a differentiator circuit which develops a differential output signal whose zero crossing points define the peaks in the head output signal. In designing the differentiator circuit, as for example when employing a delta differentiation technique, a time constant is usually selected which represents a compromise between accuracy and noise immunity. That is, as is well recognized in the art, a differentiator having a short time constant will yield greater peak detection accuracy but may be unable to distinguish between signal peaks and some noise spikes. On the other hand, a differentiator having a long time constant will mask out short duration noise spikes but will be inherently less precise in locating the signal peaks.

SUMMARY OF THE INVENTION

An object of the present invention is to provide an improved peak detection system which yields greater accuracy and noise immunity than is afforded by previously known systems.

In accordance with the present invention, first and second differential signals, respectively characterized by high accuracy and high noise rejection, are separately developed and then logically combined. In the preferred embodiment of the invention, a delta differentiation technique is employed to develop first and second binary differential signals having a relatively large time delay associated with the first such signal and a relatively small time delay associated with the second such signal. As a consequence of the respective time delays selected, the first signal is highly noise immune and the second signal is highly accurate. The two binary differential signals are applied to a logic circuit to develop a binary output signal which switches with the accuracy contained in the second differential signal but which ignores transitions in the second differential signal (attributable to noise spikes) not contained in the first signal.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
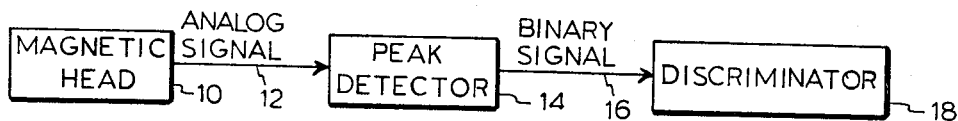
FIG. 1 is a block diagram of a typical magnetic recording system in which the peak detection system of the present invention can be advantageously employed.

Attention is now called to FIG. 1 of the drawing which illustrates an exemplary application of a peak detection system in accordance with the present invention. In the application represented in FIG. 1, a magnetic read head 10 is illustrated having an output line 12. In digital data storage systems, data is typically recorded on a magnetic medium by the magnetization of a magnetic material in one of two directions in accordance with one of several readily known data coding formats. The output signal provided on the line 12 by the magnetic head 10 will be maximum peak for switching of magnetic polarization from one direction to the other and will be an analog signal representative of the write current that magnetized the media. The amplitude of the analog signal will vary as a function of time and some means is usually provided for detecting the peaks in that analog signal so that the transitions in the recorded signal can be determined in order to enable discrimination of the relative switching times of the original write current. The magnetic head output line 12 is normally coupled through appropriate stages of amplification (not shown) to a peak detector 14 which, on output line 16, provides a binary signal whose signal transitions are indicative of the analog signal peaks. The output line 16 is coupled to a discriminator 18 which then resolves the applied binary signal into the data recorded.

Figure 2:
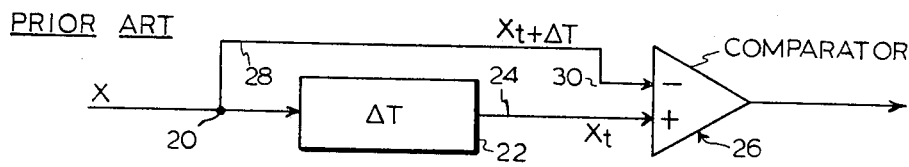
FIG. 2 is a block diagram of a typical prior art peak detector employing delta differentiation.

Attention is now called to FIG. 2 which illustrates a typical prior art peak detector usable in the system of FIG. 1. As will be seen hereinafter, the peak detector of FIG. 2 employs a delta differentiation technique in which the applied analog signal is continually sampled at two points spaced in time. A signal peak is indicated when the difference in the two samples crosses zero.

More particularly, the prior art peak detector of FIG. 2 includes a signal input terminal 20 to which is applied an analog signal whose amplitude is represented by X. The analog signal is applied through a time delay circuit 22, e.g. a delay line, to a first input terminal 24 of a comparator circuit 26. The input terminal 20 is directly connected via line 28 to a second terminal 30 of the comparator 26. Assuming the time delay introduced by the circuit 20 is represented by $\Delta T$, then the signal amplitude applied to comparator input terminal 24 can be represented by $X_t$ while the signal amplitude applied to input terminal 30 can be represented by $X_{t+\Delta T}$. The comparator 26 operates to provide a binary output signal which has a first level, e.g. "1" if the sample $X_{t+\Delta T}$ exceeds the sample $X_t$, and a second level, e.g. "o", if the sample $X_t$ exceeds the sample $X_{t+\Delta T}$. As is well known in the art, the output signal provided by comparator 26 will cross "0" at a signal peak.

In actually designing a delta differentiator peak detector of the type illustrated in FIG. 2, it is necessary, of course, to select a numeric value for $\Delta T$. As is well known in the art, if a very short value of $\Delta T$ is selected, e.g., 5 nanoseconds in a high density recording system, the analog signal peaks can be very precisely detected. However, by utilizing such a short $\Delta T$, the system will also detect short duration noise spikes which may appear in the analog signal waveform. On the other hand, if a large value of $\Delta T$ is selected, e.g., 100 nanoseconds, assuming the same high density recording system previously referred to, then the short duration noise spikes will be masked out but at the cost of losing the precision of identification of the analog signal peaks.

Figure 3:
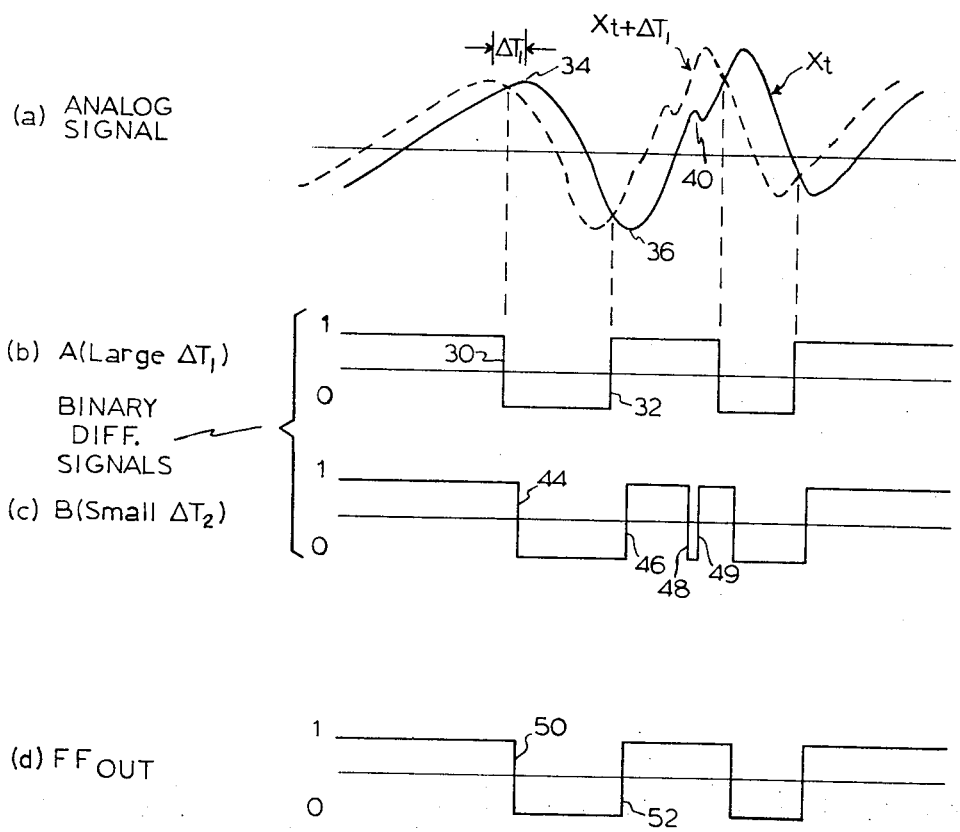
FIG. 3 is a waveform diagram illustrating in line (a) a typical analog signal, in line (b) a binary differential signal for a relatively large time delay, in line (c) a binary differential signal for a relatively small time delay, and in line (d) an output signal produced in accordance with the present invention by logically combining the binary differential signals of lines (b) and (c)

More particularly, attention is now called to FIG. 3 which in line (a) illustrates a typical analog signal $X_t$ which may be provided by the magnetic head 10 on output line 12. Line (a) of FIG. 3 also illustrates in dotted line, that same analog signal delayed by an interval $\Delta T_1$. Line (b) of FIG. 3 illustrates the binary differential signal which would be provided at the output of the comparator 26 of FIG. 2 for the case where circuit 22 defines a delay equal to $\Delta T_1$. Note that the binary differential signal of line (b) exhibits a first transition 30 from a "1" to a "0" when the signal amplitude $X_t$ exceeds the signal amplitude $X_{t+\Delta T}$. Note that a second transition 32 from a "0"

to a "1" level occurs when the signal amplitude $X_{t+\Delta T}$ exceeds the signal amplitude $X_t$. Note that the signal transitions 30 and 32 are somewhat imprecise in that they are somewhat displaced in time from the actual signal peaks 34 and 36 which they represent. However, also note that the differential signal of line (b) is immune to short duration noise spikes 40 which are small enough so as not to cross the delayed amplitude waveform $X_{t+\Delta T}$.

Line (c) of FIG. 3 illustrates the binary differential output signal from comparator 26 for a delay $\Delta T_2$ in circuit 22, considerably shorter than the delay $\Delta T_1$. Note that the signal transitions 44 and 46 in the differential signal of line (c) much more precisely define the actual signal peaks 34 and 36. However, note also that the differential signal of line (c) is susceptible to the noise spike 40 which because of the short duration of delay $\Delta T_2$ intersects the amplitude waveform $X_{t+\Delta T}$. The noise spike 40 will therefore produce the signal transitions 48 and 49 in the differential signal of line (c).

In view of the foregoing considerations, prior art peak detector designs of the type shown in FIG. 2 utilize a time delay $\Delta T$ selected to represent a compromise between high accuracy and high noise rejection.

In accordance with the present invention, in lieu of selecting a single time delay which represents a compromise between optimum noise rejection and accuracy characteristics, two binary differential signals, substantially corresponding to the signals illustrated in lines (b) and (c) of FIG. 3, are generated and then logically combined to yield a binary output signal having the high noise immunity associated with the long time delay signal and the high accuracy associated with the short time delay signal. More particularly, the binary output signal generated in accordance with the present invention is illustrated in line (d) of FIG. 3. Note that it includes signal transitions 50 and 52 which occur in time synchronism with the accurate signal transitions 44 and 46 of the differential signal of line (b). Note however, that the signal of line (d) masks out the signal transitions 48 and 49 of the differential signal of line (c).

Figure 4:
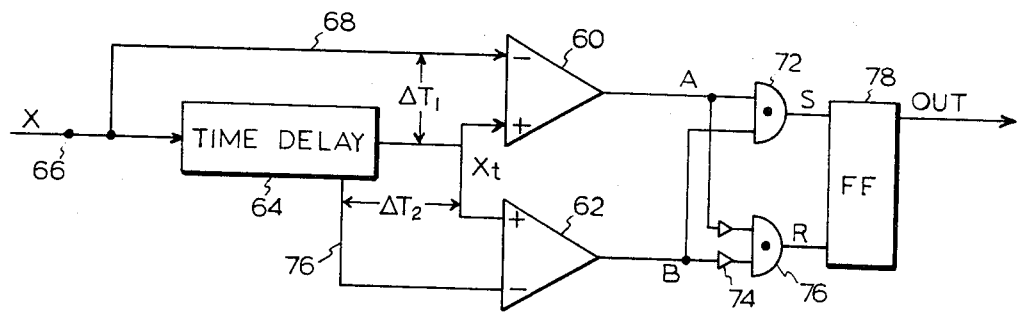
FIG. 4 is a block diagram of a preferred embodiment of the present invention.

Attention is now called to FIG. 4 which illustrates a preferred peak detection system embodiment in accordance with the present invention, for developing the output signal of line (d) of FIG. 3. The system of FIG. 4 includes first and second comparators 60 and 62 which are both supplied with amplitude signals $X_t$ available at the output of time delay device 64. The analog signal X is applied to the input terminal 66 of the time delay circuit 64 and in addition is connected via line 68 to one input terminal of the comparator 60. The second input terminal to the comparator 62 is connected to a tap 70 on the time delay device 64. Thus, the comparator 60 continually looks at amplitude sample $X_t$ and an amplitude sample delayed by the interval $\Delta T_1$ therefrom. The comparator 62 continually looks at the amplitude sample $X_t$ and a sample delayed by the interval $\Delta T_2$ therefrom. Note that in this arrangement, comparator 60 always switches to the new "1" or "0" state before comparator 62 to thus allow simple logic combining of the outputs of comparators 60 and 62 to develop the desired output signal of FIG. 3 (d). In a typical high density disc recording system, $\Delta T_1$ may be selected equal to 100 nanoseconds and $\Delta T_2$ equal to 20 nanoseconds.

Thus, the comparators 60 and 62 of FIG. 4 respectively provide binary differential output signals as represented in lines (b) and (c) of FIG. 3. The output terminals of comparators 60 and 62 are both connected directly to the input of an AND gate 72 and through inverters 74 to the input of an AND gate 76. The output of AND gates 72 and 76 are respectively connected to the set and reset input terminals of a flip-flop 78. Thus, whenever both comparators 60 and 62 define output levels of "1," the flip-flop 78 will be switched to a "1" level. Thus, the transition 52 in line (d) of FIG. 3 will occur in response to the transition 46 appearing in line (c) of FIG. 3. On the other hand, when comparators 60 and 62 both define output levels equal to "0," the flip-flop 78 will be reset. Exemplary of this is the transition 50 of line (d) of FIG. 3 in response to the transition 44 of line (c). Note that the transitions 48 occuring in line (c) of FIG. 3 will not switch flip-flop 78.

Figure 5:
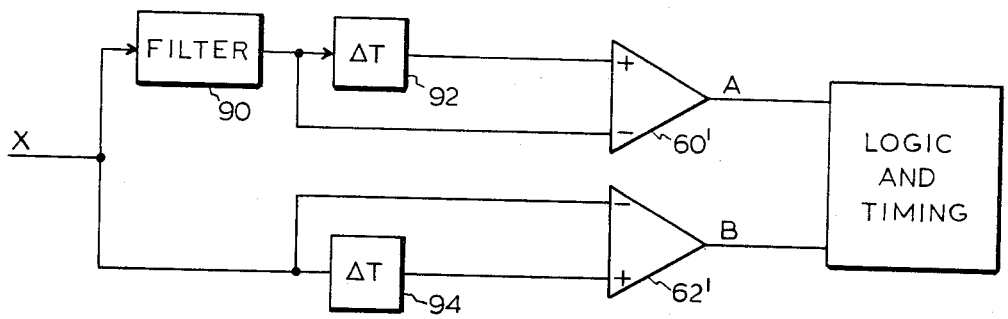
FIG. 5 is a block diagram of an alternative embodiment of the invention.

Although FIG. 4 illustrates a preferred implementation for developing the output signal of line (d) of FIG. 3 to achieve both high accuracy and high noise rejection, it is recognized that alternative implementations can be utilized to achieve essentially the same result. For example, FIG. 5 illustrates an arrangement in which the comparators 60' and 62' develop substantially the same binary differential signals as were developed by the comparators 60 and 62 of FIG. 4. However, in the implementation of FIG. 5, the input signals to comparator 60' are developed by passing the analog input signal X through a bandpass or lowpass filter 90 to remove any short duration ripple or noise therefrom. Thus, the filter 90 would for example remove the noise spike 40. The output of filter 90 is coupled directly to one input of the comparator 60' and through a short time delay circuit 92 to a second input of the comparator 60'. The effect of the filter 90 is to mask out short duration noise spikes but in so doing, it of course adversely effects the precision of the signal transitions and thus approximates the characteristics of the differential signal illustrated in line (b) of FIG. 3. The comparator 62' of FIG. 5 receives the analog input signal directly on one input terminal thereof and through a time delay 94 on a second input terminal thereof. In the implementation of FIG. 5, the time delays introduced by devices 92 and 94 may be identical. The output signals produced by the comparators 60' and 62' are then logically combined in a similar manner illustrated in FIG. 4 to derive an output signal as represented in line (d) of FIG. 3.

From the foregoing, it should now be recognized that an improved peak detection system has been disclosed herein which yields a highly accurate and highly noise immune output signal.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. A system for detecting the peaks in an analog signal whose amplitude varies with respect to time, said system comprising:

first means for comparing the amplitude of said analog signal at time (t) with the amplitude of said analog signal at time $(t+\Delta T_1)$ and for providing a first binary differential signal having a first level when the amplitude at time (t) exceeds the amplitude at time $(t+\Delta T_1)$ and a second level when the amplitude at time $(t+\Delta T_1)$ exceeds the amplitude at time (t);

second means for comparing the amplitude of said analog signal at time (t) with the amplitude of said analog signal at time $(t+\Delta T_2)$ and for providing a second binary differential signal having a first level when the amplitude at time (t) exceeds the amplitude at time $(t+\Delta T_2)$ and a second level when the amplitude at time $(t+\Delta T_2)$ exceeds the amplitude at time (t);

device means providing an output signal capable of defining at least first and second levels; and logic means responsive to said first and second differential signals simultaneously defining first levels for switching said device means output signal to said first level and to said differential signals simultaneously defining second levels for switching said device means output signal to said second level.

2. The system of claim 1 wherein the time interval at $\Delta T_1$ is considerably greater than the time interval at $\Delta T_2$.

3. The system of claim 1 including means for filtering out high frequency components from said analog signal prior to applying it to said first means.

4. A system useful in combination with a magnetic read head for detecting the peaks in an output signal provided thereby whose amplitude can vary with respect to time, said system comprising:

first means producing a first differential signal representative of the polarity of the amplitude difference of said output signal at two points in time (t) and (t+$\Delta T_1$);

second means producing a second differential signal representative of the polarity of the amplitude difference of said output signal at two points in time (t) and (t+$\Delta T_2$); and third means responsive to said first and second differential signals for producing a logic output signal which defines a first state when the polarity represented by both said first and second differential signals is positive and a second state when the polarity represented by both said first and second differential signals is negative.

5. The system of claim 4 wherein said first and second differential signals respectively produced by said first and second means are each binary signals having a first level when the polarity of the amplitude difference represented thereby is positive and a second level when the polarity of the amplitude difference represented thereby is negative.

6. The system of claim 5 wherein said third means includes a flip-flop capable of selectively defining set and reset states; and logic gate means responsive to said first and second differential signals for switching said flip-flop to said set state when said first and second differential signals simultaneously define said first level and to said reset state when said first and second differential signals simultaneously define said second level.

7. The system of claim 6 wherein $\Delta T_1 \geq 3\Delta T_2$.

* * * * *